US009171473B1

(12) United States Patent
McNally et al.

(10) Patent No.: US 9,171,473 B1
(45) Date of Patent: Oct. 27, 2015

(54) METHOD AND SYSTEM FOR DYNAMIC AUTOMATED CORRECTIONS TO WEATHER AVOIDANCE ROUTES FOR AIRCRAFT IN EN ROUTE AIRSPACE

(71) Applicant: The USA as Represented by the Administrator of the National Aeronautics & Space Administration (NASA), Washington, DC (US)

(72) Inventors: B. David McNally, Menlo Park, CA (US); Heinz Erzberger, Los Altos Hills, CA (US); Kapil Sheth, Cupertino, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 0 days.

(21) Appl. No.: 13/707,546

(22) Filed: Dec. 6, 2012

Related U.S. Application Data

(60) Provisional application No. 61/567,604, filed on Dec. 6, 2011, provisional application No. 61/664,489, filed on Jun. 26, 2012.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G01C 21/00*** | (2006.01) |
| ***G01C 21/34*** | (2006.01) |
| ***G08G 1/123*** | (2006.01) |
| ***G08G 5/00*** | (2006.01) |

(52) U.S. Cl.
CPC .................................... *G08G 5/003* (2013.01)

(58) Field of Classification Search
CPC ............. G08G 5/03; G08G 5/34; G08G 5/39
USPC .................................. 701/122, 123, 415, 423
See application file for complete search history.

(56) References Cited

U.S. PATENT DOCUMENTS

| | | | | |
|---|---|---|---|---|
| 6,266,610 | B1 * | 7/2001 | Schultz et al. | 701/528 |
| 6,314,362 | B1 * | 11/2001 | Erzberger et al. | 701/120 |
| 7,925,393 | B2 | 4/2011 | Bolt, Jr. et al. | |
| 2003/0023354 | A1 * | 1/2003 | Brust et al. | 701/3 |
| 2004/0078136 | A1 * | 4/2004 | Cornell et al. | 701/120 |
| 2008/0288164 | A1 * | 11/2008 | Lewis et al. | 701/120 |

(Continued)

OTHER PUBLICATIONS

Denery, et al., The Center-TRACON Automation system: Simulation and Field Testing, NASA Technical Memorandum 110366, Aug. 1995.

(Continued)

*Primary Examiner* — Imran Mustafa

(74) *Attorney, Agent, or Firm* — Christopher J. Menke; Robert M. Padilla

(57) ABSTRACT

A dynamic weather route system automatically analyzes routes for in-flight aircraft flying in convective weather regions and attempts to find more time and fuel efficient reroutes around current and predicted weather cells. The dynamic weather route system continuously analyzes all flights and provides reroute advisories that are dynamically updated in real time while the aircraft are in flight. The dynamic weather route system includes a graphical user interface that allows users to visualize, evaluate, modify if necessary, and implement proposed reroutes.

27 Claims, 8 Drawing Sheets

(56) References Cited

U.S. PATENT DOCUMENTS

| | | | | |
|---|---|---|---|---|
| 2009/0112645 | A1 * | 4/2009 | Jha et al. | 705/7 |
| 2010/0194628 | A1 * | 8/2010 | Christianson et al. | 342/26 B |

OTHER PUBLICATIONS

Delaura, et al., An Exploratory Study of Modeling Enroute Pilot Convective Storm Flights Deviation Behavior, 12th Conference on Aviation Range and Aerospace Meteorology, Oct. 17, 2006.

Robinson, et al., The Route Availability Planning Tool (RAPT): Evaluation of Departure Management Decision Support in New York During the 2008 Convective Weather Season, Eighth USA/Europe Air Traffic Management Research and Development Seminar, 2009.

Rubnich, et al., An Algorithm to Identify Robust Convective Weather Avoidance Polygons in En Route Airspace, 10th AIAA Aviation Technology, Integration, and Operations (ATIO) Conference, Sep. 13-15, 2010, Fort Worth, Texas.

Erzberger, et al, "Automated Conflict Resolution, Arrival Management and Weather Avoidance for ATM," 27th International Congress of the Aeronautical Sciences (ICAS), Sep. 2010.

McNally, et al., A Near-Term Concept for Trajectory-Based Operations with Air/Ground Data Link Communication, Airspace User's Forum, NASA Ames Research Center, Oct. 6-7, 2010.

* cited by examiner

270

Dynamic Weather Routes

| TP | ACID/TYP | DEP/DST | DRCT | DWR | FIX/VIA | TR | SC | WX |
|---|---|---|---|---|---|---|---|---|
| ☐ | UAL561/A319 | MSY/DEN | 16.3 | 15.0 | HBU/1 | 8 | OK | OK |
| ☐ | FFT383/A319 | KFLL/KDEN | 14.2 | 12.2 | HBU/1 | 6 | OK | OK |
| ☐ | FFT675/A319 | KMCO/KDEN | 13.9 | 10.8 | HBU/1 | 13 | OK | OK |
| ☐ | AAL2411/B752 | KDFW/KLAX | 13.2 | 12.1 | ALIBY/1 | OK | OK | OK |
| ☐ | AAL1143/MD82 | DFW/OMA | 11.3 | 10.7 | SGF/1 | OK | OK | OK |
| ☐ | TCF7671/E170 | KATL/KDEN | 9.4 | 9.4 | HBU | OK | OK | OK |
| ☐ | SWA418/B737 | KJAX/KLAS | 9.3 | 6.5 | GUP/2 | OK | OK | OK |
| ☐ | CPZ5663/E170 | DGW/MSP | 9.2 | 9.2 | SGF | OK | OK | OK |
| ☐ | TCF7518/E170 | KSAT/KORD | 9.0 | 9.0 | BAYLI | OK | OK | OK |
| ☐ | SKW4727/CRJ9 | DFW/SLC | 6.9 | 6.9 | JNC | OK | OK | OK |
| ☐ | AAL1821/B738 | KMIA/KLAS | 6.6 | 5.4 | GUP/1 | OK | OK | OK |
| ☐ | AAL1157/MD83 | DFW/SEA | 6.2 | 5.6 | JNC/2 | OK | OK | OK |

FIG. 7

METHOD AND SYSTEM FOR DYNAMIC AUTOMATED CORRECTIONS TO WEATHER AVOIDANCE ROUTES FOR AIRCRAFT IN EN ROUTE AIRSPACE

CROSS-REFERENCE TO RELATED APPLICATIONS

This application claims the benefit of U.S. Provisional Application Nos. 61/567,604 and 61/664,489, filed Dec. 6, 2011 and Jun. 26, 2012, respectively, which are hereby incorporated by reference herein in their entirety.

ORIGIN OF INVENTION

The invention described herein was made by employees of the United States Government and may be manufactured and used by or for the Government of the United States of America for governmental purposes without the payment of any royalties thereon or therefor.

BACKGROUND OF INVENTION

1. Technical Field of the Invention

This invention relates generally to the field of en-route trajectory re-routing of in-flight aircraft for weather avoidance, and more particularly, to computer automated trajectory re-routing of in-flight aircraft around convective weather for more efficient time-saving and fuel-saving weather-avoidance route corrections.

2. Description of Related Art

Weather is the leading cause of delay in the U.S. National Airspace System, and convective weather accounts for 60% of weather-related delays. Convective weather is common in the spring and summer months and can extend for hundreds of miles and reach altitudes well in excess of 40,000 feet. When weather is present or forecast along preferred flight routes, weather avoidance routes are planned and implemented, usually prior to take off. While aircraft are in flight, airline flight dispatchers, FAA traffic managers, and air traffic controllers review weather updates and traffic flows to determine if and how flights may be rerouted to improve flow and reduce delay. However, real-time automation that continuously searches for and proposes time- and fuel-saving corrections to existing weather avoidance routes for in-flight aircraft does not exist. And operators are busy, especially during weather events, and may miss workable opportunities for more efficient flight routes around weather. It would therefore be an improvement over the prior art to provide a system that automatically analyzes in-flight aircraft in en-route airspace and finds simple reroutes that result in more efficient flight around convective weather and potentially save substantial flying time and fuel.

The features and advantages of the present disclosure will be set forth in the description that follows, and in part will be apparent from the description, or may be learned by the practice of the present disclosure, without undue experimentation. The features and advantages of the present disclosure may be realized and obtained by means of the instruments and combinations particularly pointed out in the appended claims.

SUMMARY OF THE INVENTION

The present invention provides an automated system for en-route trajectory rerouting of aircraft for convective weather avoidance. Convective weather is generally weather that in-flight aircraft should avoid for safety reasons. The system uses computer automation to continuously and automatically compute and propose time-saving and fuel-saving corrections to current convective weather-avoidance routes for in-flight aircraft in en route airspace. Given the relatively large potential for flying time-savings, for example, on the order of 5 to 25 minutes per eligible flight, the automation may be used by airline flight dispatchers and may be configured for use by U.S. Federal Aviation Administration (FAA) traffic managers and air traffic controllers.

In accordance with one illustrative aspect of the present invention, there is provided a method for analyzing in-flight aircraft in en-route airspace to automatically find time-saving corrections to existing weather-avoidance routes. The method includes automatic methods for finding candidate flights, detecting weather and traffic conflicts, computing candidate alternate routes that resolve weather and optionally traffic conflicts, converting candidate alternate routes to simpler reroutes based on nearby named fixes, testing wind-corrected flying-time savings, testing downstream sector congestion, checking for active special-use airspace, and posting flights where a successful dynamic weather route is found onto a dynamic weather routes listing on a display. The method also includes providing automated interactive point, click, and drag graphical user interface functions that enable users to visualize proposed dynamic weather routes, modify them if necessary, and re-evaluate key parameters such as flying time savings or delay, proximity to current and forecast weather, traffic conflicts, sector congestion, and active special use airspace.

In accordance with another illustrative aspect of the present invention, finding candidate flights may include finding flights with large dog-legs in their current routes of flight. The step may also include identifying reference routes between current positions and downstream return capture fixes, where the reference routes eliminate large dog-legs and are generally more desirable routes as determined by their potential for wind-corrected flying time savings, but may not be flyable due to the presence of convective weather or traffic conflicts. The large dog-legs may be ones where the flying time savings of the reference routes are greater than a critical trigger value. The critical trigger value may be, for example, 5 minutes. In practice, during convective weather periods reference routes, if flyable, could potentially save 10, 20, or even 30 minutes. This large potential for savings is the principal reason that airline flight dispatchers may benefit greatly from the present invention. The reference routes may be direct routes, wind-optimal routes, routes to a more efficient standard arrival route into a destination airport, or other airspace user-preferred routes. The default downstream return capture fixes are limited so as not to propose routes that take aircraft substantially off the portion of their current route not impacted by weather. Limiting functions could include ensuring the default capture fix is inside a limit rectangle or other suitable limit region, and is no further downstream than the last fix before the standard arrival routes, and is, for example, at least 100 nautical miles or more from the destination airport.

In accordance with still another illustrative aspect of the present invention, detecting weather and traffic conflicts may include testing reference routes for conflict with modeled weather and/or traffic. The step of resolving weather and traffic conflicts includes automatically forming candidate alternate routes that may include one or more inserted auxiliary waypoints to avoid current and forecast convective weather. The candidate alternate routes are between current positions and a downstream return capture fix optionally via one or more auxiliary waypoints. The step may also include selecting the candidate alternate route that have the minimum flying time delay relative to the preferred reference route and then testing the candidate alternate route to determine if it meets the flying time savings relative to the flight plan route to become the dynamic weather route. It is noted that, because an in-flight aircraft is traveling at a high rate of speed, the aircraft's "current position", as the term is used in the present invention, includes positions just ahead of the aircraft, to allow for delays in computer processing time and human actions.

In accordance with yet another illustrative aspect of the present invention, selecting nearby named fixes may include replacing auxiliary waypoints of the candidate alternate route with nearby named fixes for ease of implementation and flying of such routes. The named fixes may be within, for example, 25 nautical miles of auxiliary waypoints originally computed using the more general fix-radial-distance (FRD) or latitude/longitude (LAT/LON) format. The selected nearby named fixes may be that combination of fixes that minimizes flying time delay relative to the initial candidate alternate route trajectory that was computed using the general FRD or LAT/LON format, while not resulting in a named-fix trajectory that conflicts with modeled weather.

In accordance with yet another illustrative aspect of the present invention, the step of testing flying time savings may include selecting as the dynamic weather routes those candidate alternate routes that save more than parameter minutes relative to actual current flight plan trajectories. The parameter minutes may be, for example, 5 minutes.

In accordance with another illustrative aspect of the present invention, testing downstream sector congestion may include checking an aircraft's current flight plan trajectory and candidate alternate route trajectory for travel through congested airspace sectors. The step may also include displaying sector congestion, along current flight plan routes, and along dynamic weather routes on the sector congestion display. This step enables users to compare congestion along the current flight plan route to congestion along the dynamic weather route. This step could include limiting selection of dynamic weather routes based on anticipated downstream sector congestion.

In accordance with another illustrative aspect of the present invention, the step of posting flights to a dynamic weather routes listing on a display may include showing aircraft call signs and aircraft types, departure and destination airports, reference route and dynamic weather route savings in minutes, return capture fixes and the number of and/or names of auxiliary waypoints in the dynamic weather routes, traffic conflict status indicators, sector load status indicators, weather conflict status indicators, and other indicators such as those relating to active traffic flow management restrictions.

In accordance with another illustrative aspect of the present invention, there is provided a method for automatically computing candidate alternate routes relative to the reference route such that the trajectories for the candidate alternate routes do not conflict with modeled weather, or optionally modeled weather and traffic, and have a minimum flying time delay relative to reference route trajectories. The method may include an iterative process whereby multiple candidate alternate routes, all that avoid one or more modeled weather polygons are computed and tested. Candidate alternate routes are computed by inserting one or more auxiliary flight plan waypoints near the boundaries of modeled weather polygons, and options may for example compare alternate routes that deviate to the left or to the right of modeled weather, and consider multiple alternate routes around primary (first polygons along path) and secondary (additional downstream polygons) weather polygons to find to the best route around modeled weather. Trajectories for all candidate alternate route options consider the forecast movement and growth or decay of polygons with time. Successful solutions are then optionally further modified to resolve traffic conflicts. The successful solution with the minimum flying time delay relative to the reference route is then returned to determine if it meets the criteria to be the dynamic weather route. Candidate alternate routes are optionally converted to routes based on nearby named fixes. Candidate alternate routes are finally tested to determine potential flying time savings relative to the current flight plan route is large enough for the candidate alternate route to be posted as the dynamic weather route.

In accordance with still another illustrative aspect of the present invention, candidate alternate routes that avoid weather polygons are computed geometrically with limits on complexity built into the route generation process. This is an improvement over common grid-based methods that have been developed to create paths through fields of polygons, e.g., the Dijkstra method. These common methods are susceptible to generating jagged or dog-legged trajectories not suitable for commercial airline transport operations.

In accordance with another illustrative aspect of the present invention, calculating new route deviations may include using at least one auxiliary waypoint and/or at least one named fix.

In accordance with another illustrative aspect of the present invention, candidate alternate routes are limited (i.e., restricted in configuration, for example, but not limited to, no large heading changes) for commercial jet transport operations so as not to produce either large heading changes, or auxiliary waypoints that are too close to one another. In addition, solutions incorporate suitable buffers between proposed routes and modeled weather polygons, and solutions are tested and adjusted to ensure suitably sized gaps in cases where a candidate alternate route passes between two modeled polygons.

These and other advantages are achieved in accordance with various illustrative embodiments of the present invention as described in detail below.

BRIEF DESCRIPTION OF THE DRAWINGS

The features and advantages of the disclosure will become apparent from a consideration of the subsequent detailed description presented in connection with the accompanying drawings in which:

FIG. 7 is an exemplary screen shot of a dynamic weather route flight list generated pursuant to an illustrative embodiment of the present disclosure.

DETAILED DESCRIPTION

Figure 1:
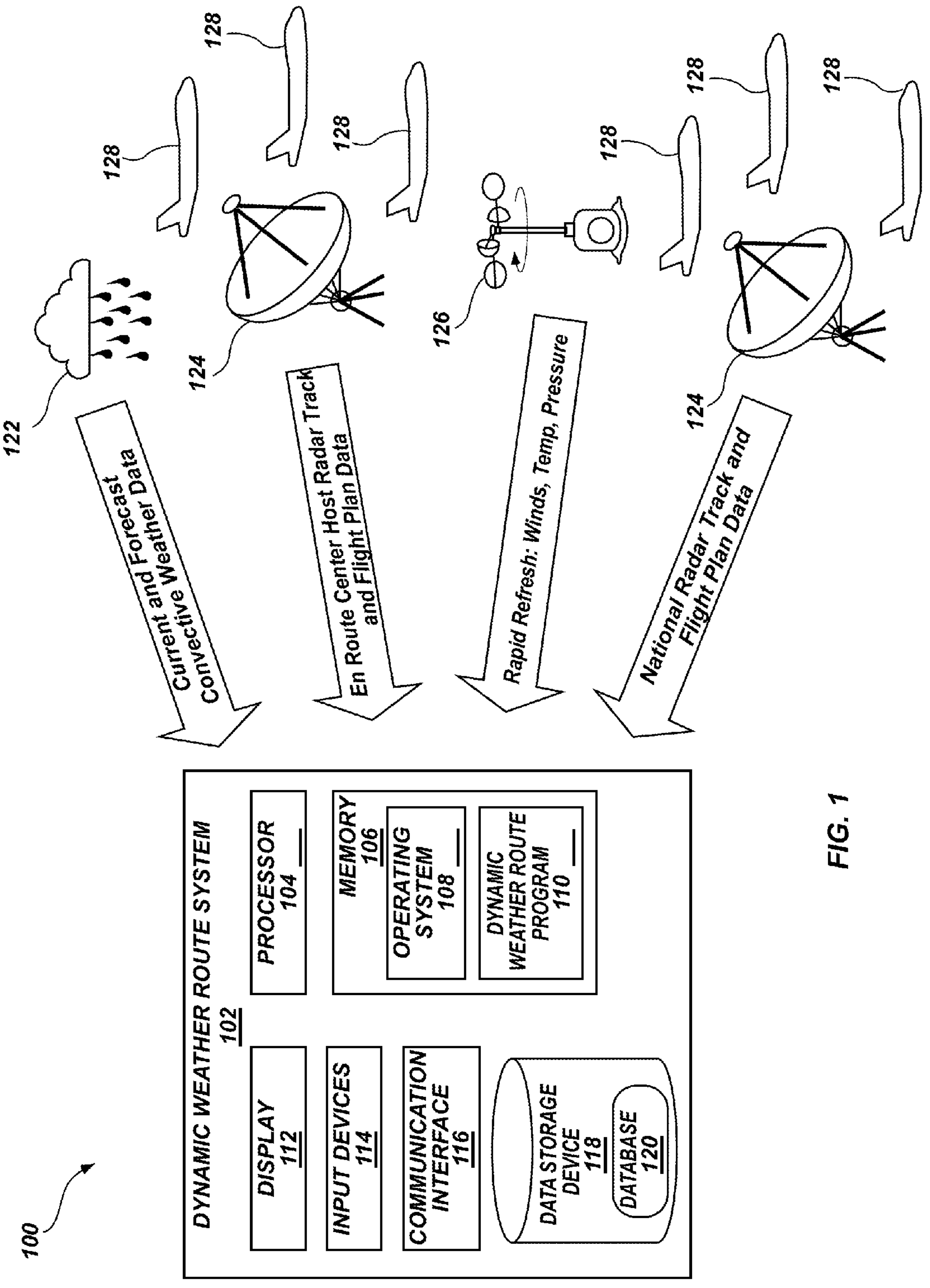
FIG. 1 is a block diagram of an exemplary dynamic weather route system according to an illustrative embodiment of the present disclosure.

For the purposes of promoting an understanding of the principles in accordance with the disclosure, reference will now be made to the illustrative embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Referring now to FIG. 1, there is shown a block diagram of a framework 100 for dynamically routing in-flight aircraft pursuant to an illustrative embodiment of the present invention. The framework 100 comprises a dynamic weather route system 102 for generating dynamic weather routes for in-flight aircraft.

In an illustrative embodiment, the dynamic weather route system 102 comprises a processor 104 coupled to a memory 106. It will be appreciated that the processor 104 executes computer-readable instructions, known as programs or applications, to perform the functions and features described herein. It will be further appreciated that while only a single processor 104 is depicted in FIG. 1, that the processor 104 may comprise a plurality of processors spread out over several machines.

In an illustrative embodiment, the dynamic weather route system 102 may comprise a collection of computer servers, each having its own processor, that are connected to an internal, or external, network with each server performing unique tasks or a group of servers sharing the load of multiple tasks. Each server includes a processor coupled to a memory. The system is scalable as is known to those skilled in the art to accommodate large demand on the dynamic weather route system 102. For example, the dynamic weather route system 102 may comprise a plurality of servers. In an illustrative embodiment, a plurality of users may access the dynamic weather route system 102 from remote computing devices to access the features and functionalities of the system 102.

Loaded into the memory 106 is a program commonly known as an operating system 108. It will be appreciated that the operating system 108 may be selected from a wide range of commercially available operating systems, including, without limitation, the different versions of Microsoft® Windows®, Linux, and Mac OS®. In an embodiment, the system 102 uses the Linux operating system running on one single rack-mounted processor (ASL Lancelot 1876-T, 3.07 Gz).

Also, stored in the memory 106 is a dynamic weather route program 110. The dynamic weather route program 110, contains instructions, that when executed by the processor 104, cause the processor 104 to generate dynamic weather routes for in-flight aircraft as will be described more fully herein. In an illustrative embodiment, the dynamic weather route program 110 includes several different subsets of executable code that are selectively loaded into the memory 106. In an illustrative embodiment, the executable code of the dynamic weather route program 110 may be located in several independent executable files. In an illustrative embodiment, the dynamic weather route program 110 includes one or more modules. As used herein, the term "module" refers to a section of the code of the dynamic weather route program 110, that may or may not be located in separate executable files.

The dynamic weather route system 102 further comprises a computer display 112 and input devices 114. In regard to the input devices 114, they may comprise a keyboard and computer mouse.

The dynamic weather route system 102 further comprises a communication interface 116 that allows the system 102 to communicate with other computing devices over a network to receive and transmit data, including local area networks and wide area networks. The dynamic weather route system 102 further comprises a data storage device 118, such as a hard drive or an array of hard drives that contains a database 120 and operational data.

As will be described below, the dynamic weather route system 102 receives data inputs from a wide variety of sources to compute dynamic weather routes for in-flight aircraft. The data inputs are nominally one of live data feeds, or recorded data feeds for running the dynamic weather route system in playback mode.

The dynamic weather route system 102 receives current and forecast weather model data from a weather data source 122. In an illustrative embodiment, the weather data comprise current and forecast model data from the Corridor Integrated Weather System (CIWS), which was developed at MIT Lincoln Laboratory. CIWS is based on analysis of vertically integrated data and echo top data from NexRad weather radars. (NexRad is a network of high-resolution S-band Doppler weather radars operated by the National Weather Service, an agency of the National Oceanic and Atmospheric Administration of the United States Department of Commerce.) In an illustrative embodiment, the weather data are updated every 5 minutes and each update includes forecast weather out to two hours in 5 minute forecast time step intervals.

The dynamic weather route system 102 receives host radar tracking data and flight plan data from a radar data source 124. In an illustrative embodiment, the radar data source 124 is the Center Host or En Route Automation Modernization (ERAM) computer system operated by the FAA. In an embodiment, the radar track data and flight plan data are updated every 12 seconds with fresh surveillance tracking data and flight plan amendments. It will be appreciated that frequent updates are needed so that flight plan intent is up to date and traffic conflict detections are reliable.

The dynamic weather route system 102 receives atmospheric data, including wind, temperature, and pressure data, from an atmospheric monitoring and forecast modeling source 126. In an illustrative embodiment, the atmospheric monitoring and modeling source 126 is the National Oceanic and Atmospheric Association (NOAA) Rapid Refresh atmospheric data, including wind forecasts. In an illustrative embodiment, the atmospheric data are updated every hour from the atmospheric monitoring source 126.

The dynamic weather route system 102 receives national surveillance radar track and flight plan data from an air traffic data source 128 (for example, but not limited to, an aircraft transponder). In an illustrative embodiment, the air traffic data source 128 comprises the Enhanced Traffic Management System (ETMS) or the undelayed Aircraft Situation Display to Industry (ASDI) system. In an illustrative embodiment, the air traffic data are updated every minute from the air traffic source 128.

Prior to proceeding, it is important to note that the present invention leverages several existing technologies to implement its features and functionalities described herein. In an illustrative embodiment, these existing technologies are integrated directly into the dynamic route system 102 such that processor 104 performs them. For example, code from these existing technologies may be included in the dynamic weather route program 110. In an illustrative embodiment, these existing technologies may be run on a separate computer server that provides its resources to the dynamic weather route system 102 over a network. In an illustrative embodiment, these existing technologies are operated by third parties.

In an illustrative embodiment, the existing technologies include the Corridor Integrated Weather System (CIWS), the Convective Weather Avoidance Model (CWAM), both of which were developed by the MIT/Lincoln Laboratory. In an illustrative embodiment, the existing technologies further include the Center/TRACON Automation System (CTAS), the Future Air Traffic Management Concepts Evaluation Tool (FACET) and the automatic weather and traffic conflict resolution elements in the Advanced Airspace Concept (AAC) automation software suite, all of which were developed by the National Aeronautics and Space Administration (NASA). (Erzberger, H. and Lauderdale, Todd and Chu, Yung-Cheng, "Automated Conflict Resolution, Arrival Management and Weather Avoidance for ATM" (2010), 27th International Congress of the Aeronautical Sciences (ICAS), Nice, France, 19-24 Sep. 2010, is hereby incorporated by reference in its entirety by way of background disclosure.) It will be appreciated that the present invention augments and improves the capabilities of these existing technologies as described herein.

Figure 2:
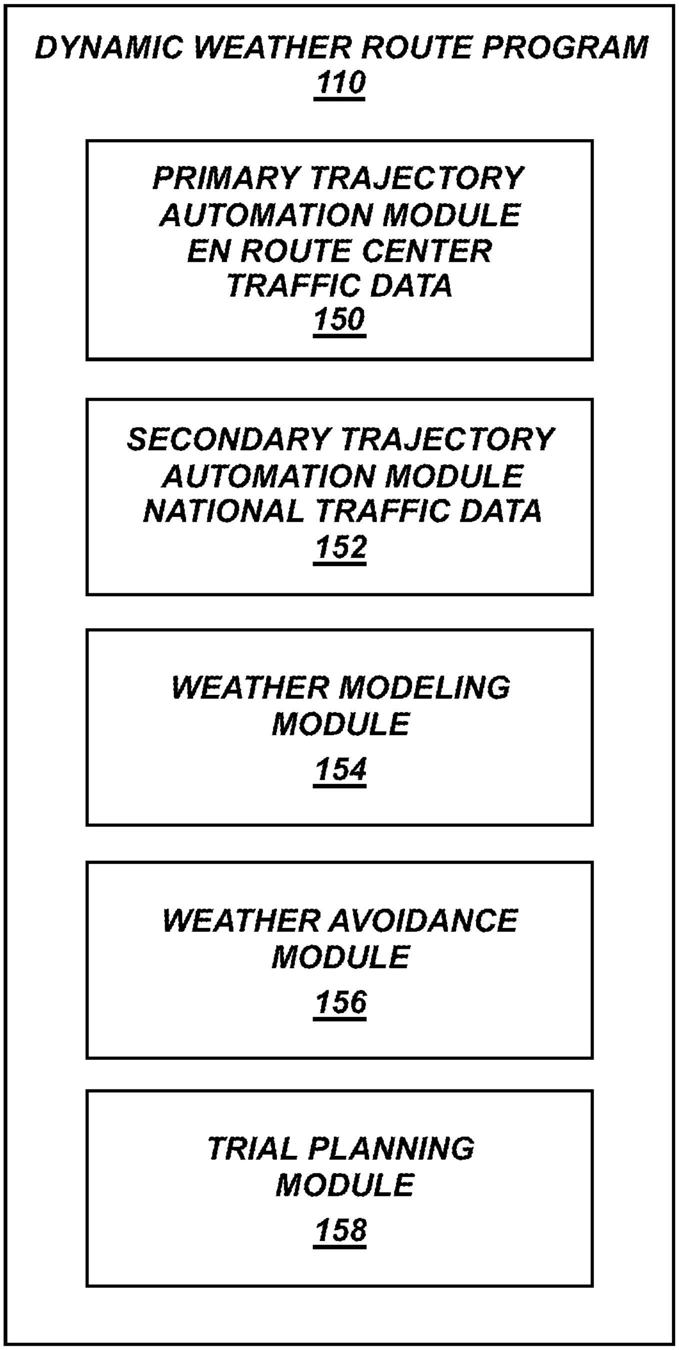
FIG. 2 is a block diagram of an exemplary dynamic weather route program according to an illustrative embodiment of the present disclosure.

Referring now to FIG. 2, the dynamic weather route program 110 includes a primary trajectory automation module 150, a secondary trajectory automation module 152, a weather-modeling module 154, a weather and traffic avoidance module 156, and a trial planning module 158. The operation of each of these is described generally below.

The primary trajectory automation module 150 computes 4D trajectories for all in-flight aircraft in a designated airspace. In an illustrative embodiment, the primary trajectory automation module 150 computes 4D trajectory predictions (x, y, h, time) for all flights using live or recorded data feeds. The primary inputs into the primary trajectory automation module 150 are Center Host or ERAM surveillance radar track messages, Center Host or ERAM route and altitude flight plan intent messages as entered and updated by controllers, NOAA Rapid Refresh atmospheric data, including wind forecasts, updated every 1 hour, and a database of aircraft performance models. All flight trajectories are updated upon receipt of fresh radar track and flight plan messages entered into the FAA's en route Center Host or En Route Automation Modernization (ERAM) computer system. It will be appreciated that the Host track and flight plan updates are needed so that flight plan intent is up to date and traffic conflict detections are reliable. In an illustrative embodiment, trajectories include modeled top-of-climb and top-of-descent points and incorporate hourly Rapid Refresh wind updates that include wind variation with altitude. Updating may occur periodically, such as every 12 seconds. In an illustrative embodiment, the primary trajectory automation module 150 incorporates the existing technology of CTAS.

In an illustrative embodiment, the primary trajectory automation module 150 compares all fresh flight trajectories to modeled weather polygons computed by the weather modeling module to determine or detect when flight trajectories conflict with modeled weather polygons.

In an illustrative embodiment, the primary trajectory automation module 150 converts candidate alternate routes generated by the weather avoidance module 156 and the trial planning module 158 into trial flight trajectories. The primary trajectory automation module 150 then tests these trial flight trajectories for conflict with modeled weather polygons and returns conflict status information to the weather avoidance module 156 and/or the trial planning module 158.

The secondary trajectory automation module 152 computes 4D trajectories and predicted sector loadings for all flights in a designated airspace. Trajectories and sector load predictions are updated every 1 minute, for example, using data from the ETMS and ASDI. In an illustrative embodiment, the secondary trajectory automation module 152 estimates the potential impact of a reroute on downstream sector congestion; many of the relevant sectors are outside of the Center where the flight is currently flying. Inclusion of downstream sector analysis capability is important because some of the proposed reroutes substantially change the route of flight. One particular factor that is analyzed is whether or not the reroute takes an aircraft through a nearby downstream sector that is already over capacity, or the potentially more desirable case where the reroute takes an aircraft out of sectors that are over capacity and potentially into sectors that are under capacity. In an illustrative embodiment, the secondary trajectory automation module 152 incorporates the existing technology of FACET.

The weather-modeling module 154 predicts regions of convective weather in terms of polygons, which are characterized in terms of storm intensity and storm tops. The weather-modeling module 154 predicts storm intensity, movement and growth over time up to a two-hour look-ahead time. Model input data are updated periodically, e.g., every 5 minutes. A suitable look-ahead time step, e.g., every 5 minutes, is selected to update predicted future storm polygons. In an illustrative embodiment, the weather-modeling module 154 incorporates the existing technology of CWAM.

The weather avoidance module 156 attempts to find candidate alternate routes when modeled weather cells are detected along a flight plan route, or along a reference route, or along a Direct-To route. In an illustrative embodiment, the weather avoidance module 156 incorporates the technology of ACC.

In accordance with another illustrative aspect of the present invention, there is provided a method for automatically computing candidate alternate routes relative to the reference route such that the trajectories for the alternate routes do not conflict with modeled weather, or optionally modeled weather and traffic. The alternate routes selected for further analysis are ones that avoid weather, and optionally traffic, and have trajectories with minimum flying time delay relative to reference route trajectories. The method includes an iterative process whereby multiple alternate route options all that avoid one or more modeled weather polygons between present position and a downstream flight plan fix are computed and tested. Alternate routes are computed by inserting one or more auxiliary flight plan waypoints near the boundaries of modeled weather polygons. Alternate route options may for example initially turn the aircraft to the left or to the right of the reference route to avoid the first weather polygon and then find a route to the downstream flight plan fix that does not conflict with any secondary weather polygons downstream of the first one. Trajectories for all alternate route options are computed and probed against modeled weather polygons, which are generally moving, growing, or decaying with time according to the forecast weather model. Successful solutions are then optionally further modified to resolve traffic conflicts. The successful solution with the minimum flying time delay relative to the reference route is then returned as a candidate alternate route, which is further tested to determine potential flying time savings relative to the current flight plan route.

In accordance with still another illustrative aspect of the present invention, candidate alternate routes that avoid weather polygons are computed geometrically with limits on complexity built into the route generation process. This is an improvement to common methods that have been developed to create paths through fields of polygons, e.g., the Dijkstra method. These common methods are susceptible to generating jagged or dog-legged trajectories not suitable for commercial airline transport operations. The core geometric solution relies on two core elements, the first determines tangent lines from a point to the boundary of a polygon while the second determines tangent lines between non-intersecting polygons, e.g., between the first detected polygon and any secondary polygons.

Figure 6:
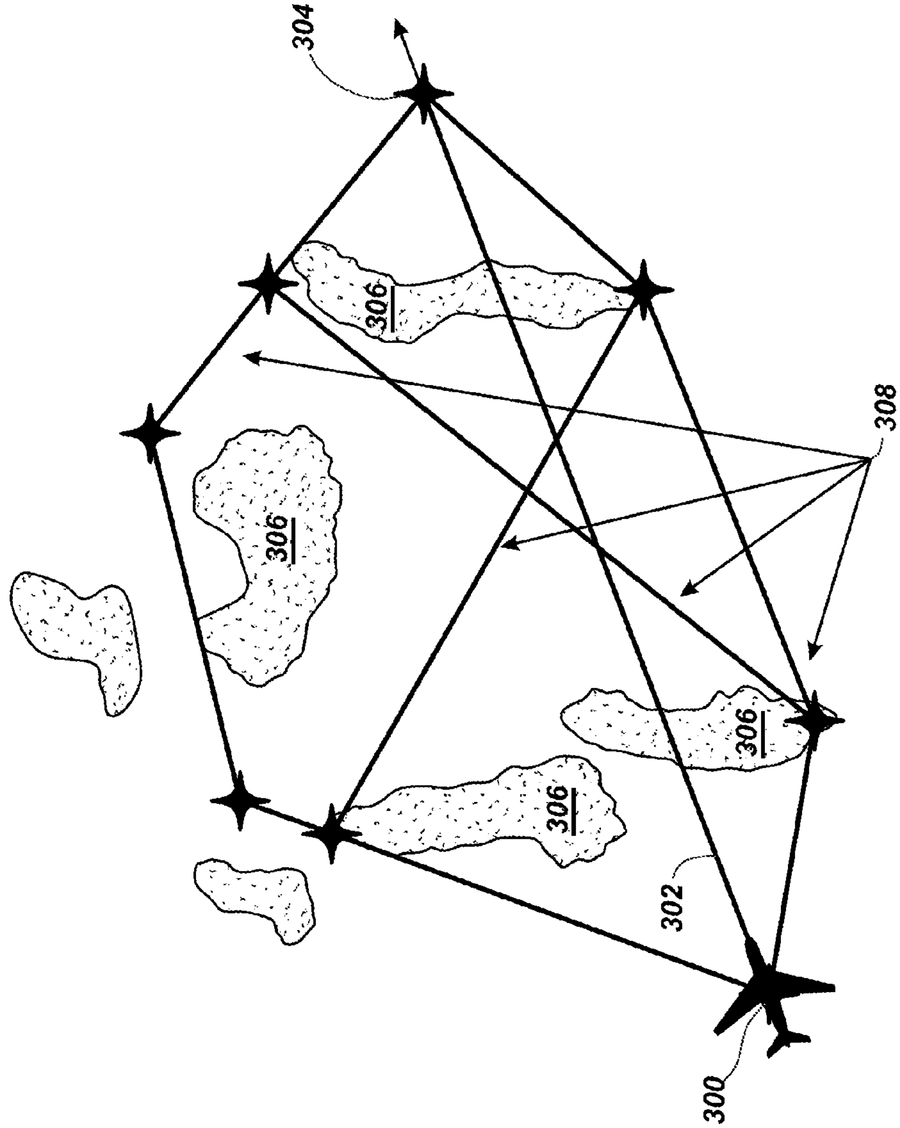
FIG. 6 depicts a diagram showing a reference route and four possible candidate alternate routes around multiple weather cells according to an illustrative embodiment of the present disclosure.

For example, as shown in FIG. 6, there is depicted a flight 300 having a reference route 302 to a waypoint 304. As can be observed, the route 302, if taken, would cross two weather polygons 306. Four possible flight paths 308 to waypoint 304 are generated by the present invention around the two weather polygons 306 that include interior tangent routes.

In accordance with another illustrative aspect of the present invention, calculating candidate alternate route deviations may include using at least one auxiliary waypoint and/or at least one named fix.

In accordance with another illustrative aspect of the present invention, candidate alternate routes are limited so that heading changes between present position and subsequent auxiliary waypoints, and between multiple auxiliary waypoints, and between the last auxiliary waypoint and the return capture fix may be limited so as not to propose very large heading changes which are generally not appropriate for commercial airline flight trajectories. The relative position of auxiliary waypoints may be limited so as not be to so close to one another that they are generally not appropriate for commercial airline flight trajectories.

In accordance with another illustrative aspect of the present invention, auxiliary waypoints may be adjusted to include suitable buffers between modeled weather and the resulting flight trajectories.

In accordance with another illustrative aspect of the present invention, candidate alternate routes, including the number and location of auxiliary waypoints, may be limited so that flight trajectories do not pass through narrow gaps between weather polygons that are generally not suitable for commercial airline flight trajectories.

In accordance with another illustrative aspect of the present invention, the trial planning module 158 is an automated and interactive "what-if" trial planning function that allows users to quickly and easily visualize a proposed dynamic weather routes using a graphical user interface, easily modify the route if necessary using point, click, and drag actions, and evaluate in real-time the impact of any modifications to the proposed route on critical parameters including proximity to weather, wind-corrected flying time savings or delay, sector congestion on the current flight plan route and the proposed trial flight plan route, traffic conflicts, and conflict with active special use airspace.

In accordance with another illustrative aspect of the present invention, the trial planning module 158 includes new functions that are particularly relevant to the needs of the dynamic weather routes system 102 as described in more detail herein.

Core functions of the trial planning module 158, and other similar trial planning functions that currently exist, include automated graphic display of "what if" trial routes in response to user inputs, the impact of such trial routes on downstream traffic conflicts, and the wind-corrected flying time savings or delay of such trial routes relative to the current flight plan route.

In accordance with another illustrative aspect of the present invention, the trial planning module 158 also enables users to evaluate the proximity of the trial route trajectory on current and forecast weather, to assess the impact of the trial route on downstream sector congestion including comparing congestion on the trial route and the current flight plan route, and to determine if the trial route passes through active special use airspace.

In accordance with another illustrative aspect of the present invention, the trial planning module 158 also facilitates automated switching between auxiliary waypoints, which are defined generally in terms of fix-radial-distance or latitude/longitude coordinates to nearby named auxiliary waypoints, which are easier to implement in today's operations. The trial planning function also facilitates timely implementation of the reroute either by voice or by integration with other flight planning systems including air/ground data link communication. The trial planning module incorporates existing technology in CTAS and Direct-To and their associated displays.

Figure 3:
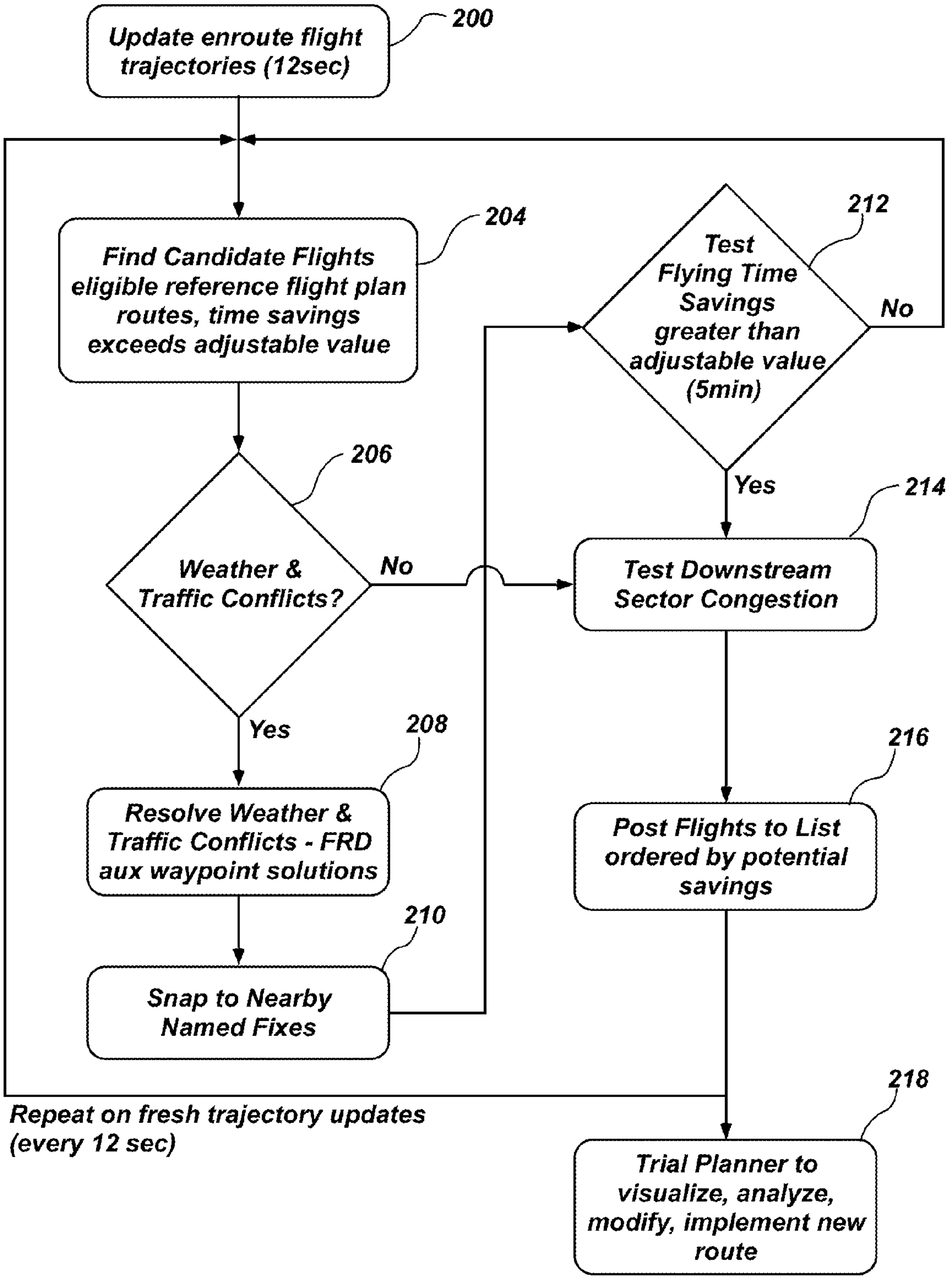
FIG. 3 is an exemplary flow diagram of a method for generating dynamic weather routes according to an illustrative embodiment of the present disclosure.

Referring now to FIG. 3, the operation of the dynamic weather route system 102 to find dynamic weather routes for in-flight aircraft will now be described in more detail. At step 200, the dynamic weather route system 102 updates the flight plan trajectories for all in-flight aircraft in en route Center airspace. At step 204, the dynamic weather route system 102 automatically analyzes the most recent trajectory updates to find flights that could potentially benefit from a more efficient routing around weather or other conflicts.

The objective of analyzing the most recent trajectory updates is two-fold. First, the dynamic weather route system 102 finds flights with large course changes or "dog-legs" in their current flight plan routes. Second, for each of the flights, the dynamic weather route system 102 identifies a reference route that, if it were feasible and could be flown, eliminates the dog-leg and returns the aircraft to its current route of flight at some downstream return capture fix, and by doing so save an adjustable minimum amount of wind-corrected flying time, e.g., 5 minutes. This adjustable minimum amount of flying time savings is intentionally set to some large value, e.g., 5 minutes or more, because dog-legs that could result in large savings if eliminated are usually in place for weather avoidance. The large trigger value also usually prevents the dynamic weather routes system from generating alerts for simple direct routes to downstream fixes that would occur without convective weather present.

Figure 4:
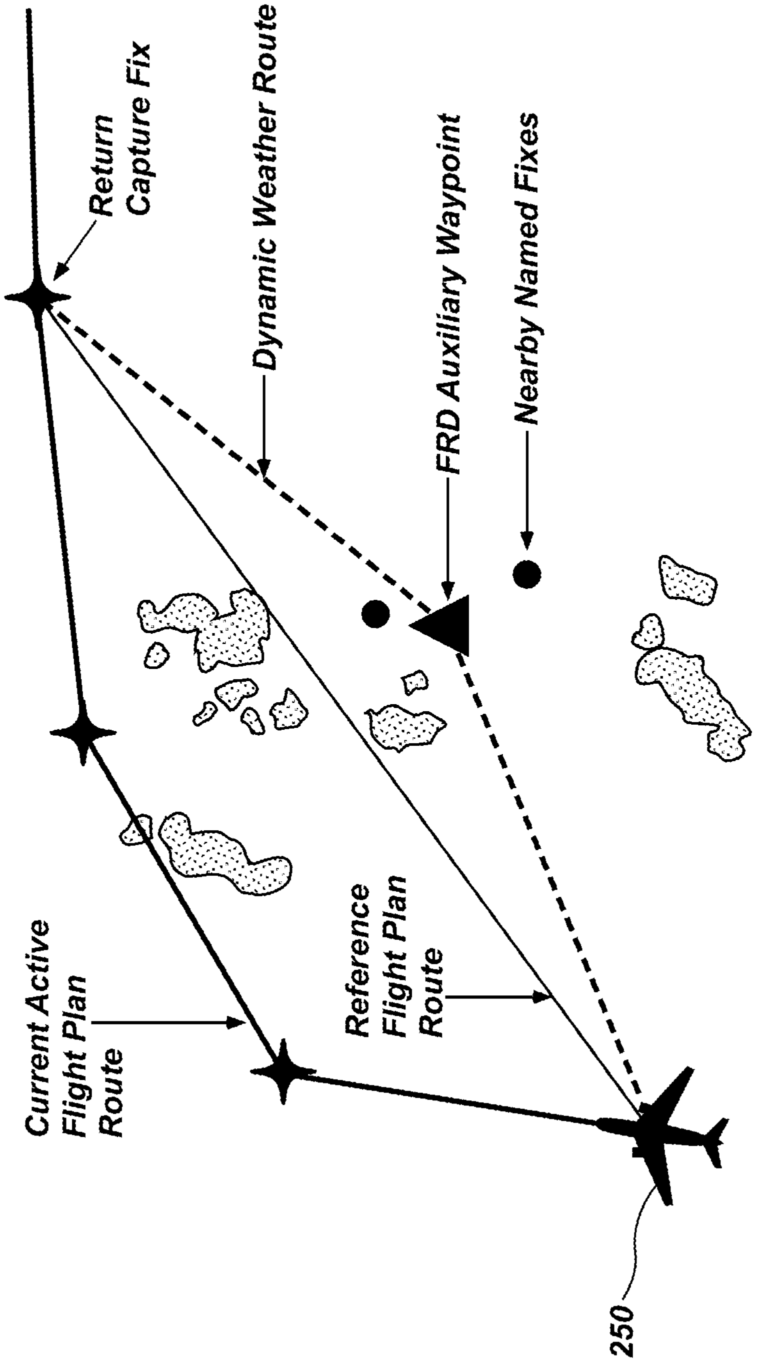
FIG. 4 is a diagram of a current active flight plan route of a flight, a reference route (or reference flight plan route), and a dynamic weather route generated according to an illustrative embodiment of the present disclosure.

For example, FIG. 4 depicts a current active flight plan route of an aircraft 250. Also shown is the reference route (or reference flight plan route) for the aircraft 250 generated by the dynamic weather route system 102. It will be noted that the reference route eliminates the dog-leg in the current active flight route plan. In addition, the reference plan returns the aircraft 250 to its current active flight plan route at a downstream capture fix. For the flight to be considered for further analysis, this reference route must be able to save an adjustable minimum amount of wind-corrected flying time, e.g., 5 minutes.

At this point, it will be appreciated that the reference route is not necessarily free of weather and traffic conflicts. It is, however, a theoretically more desirable route and later steps will determine necessary adjustments to enable a conflict-free route that is as close as possible to the reference route.

Further, it will be appreciated that the presence of a large course change or dog-leg in a downstream route of flight is a strong indication that the flight is on a route previously implemented for weather avoidance, otherwise the large dog-leg would in most cases not be in the route. A large course change or dog-leg in a current flight plan is generally defined to exist when a reference route can be found that saves more than an adjustable amount of wind-corrected flying time, e.g., 5 minutes. In an illustrative embodiment, the return capture fix is an existing fix on the current active flight plan route. The reference route generated by the dynamic weather route system 102, and not the current active flight plan route, is the basis for resolving weather and traffic conflicts as will be described in more detail hereinafter.

The notion of a reference route is based on the important assumption that in cases where large dog-legs are present in the current route of flight, the flight might be eligible for a time and fuel saving reroute. If anticipated weather conflicts do not materialize, or if the weather has changed since the current active flight plan was implemented, then the aircraft should be able to fly something closer to the reference route instead of the current flight plan.

In an illustrative embodiment, the reference route generated by the dynamic weather route system 102 is one of a direct route to a suitable downstream fix, a wind-optimal route to a downstream fix, or a route to a more efficient standard arrival route (STAR) into the destination airport, or some other user-preferred route. In an illustrative embodiment, the distinguishing characteristic of the reference route is that it proposes a flight plan route that is substantially more favorable than the current flight plan route and would likely be acceptable if there were no weather.

In an embodiment, the reference route will most always reflect a relatively large wind-corrected flying time savings relative to the current flight plan route. Thus, in an illustrative embodiment, the direct-to route often becomes the reference route. The dynamic weather route system 102 automatically finds direct-to routes to eligible downstream fixes that can save one or more minutes of flying time, wind-corrected. For the dynamic weather routes tool, the system is configured to ignore flights with direct-to routes that save less than the trigger value for the dynamic weather routes tool, e.g., 5 minutes.

For the dynamic weather route system 102, a flight with a large dog-leg is one where the flying time savings to a downstream fix is greater than a predetermined critical trigger value, 5 minutes for example. In an embodiment, the critical trigger value is adjustable by the user based on workload, airspace, and other factors. For example, a user may specify a time savings less than 5 minutes or more than 5 minutes depending on user workload. In an embodiment, eligible downstream return capture fixes are limited so as not to propose a new route that takes an aircraft substantially off the segment of the current route near the destination airport, or substantially off the portion of current flight plan route not impacted by weather.

Figure 5:
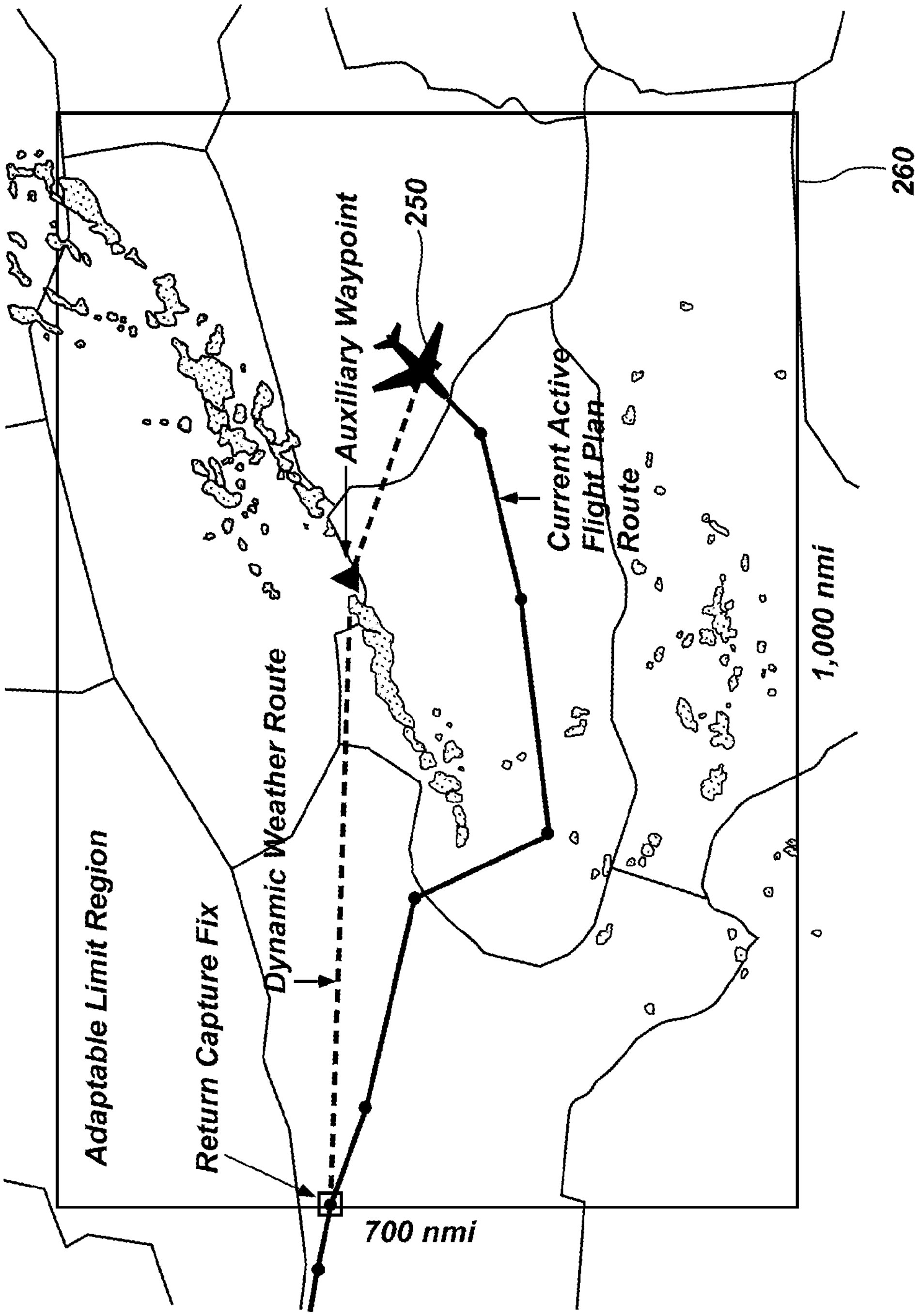
FIG. 5 depicts a diagram of an exemplary limit rectangle for a return capture fix according to an illustrative embodiment of the present disclosure.

In an illustrative embodiment, and as shown in FIG. 5, the return capture fix is the furthest downstream flight plan fix that satisfies one, two, or all of the following criteria: (i) the return capture fix is inside a limit rectangle 260, (ii) the return capture fix is the last fix before the Standard Arrival Route, and (iii) the return capture fix is 100 nautical miles or more from the destination airport.

In an illustrative embodiment, the limit rectangle 260 is user adaptable and may be adjusted as appropriate for the particular airspace. For example, the limit rectangle 260 for a U.S. East Coast Center will likely be smaller or have one or all of its boundaries (North, South, East, West) closer to the home Center boundary. Alternatively, the return capture fix may be selected as a function of routing between city pairs. In an illustrative embodiment, capture fix selection limits are determined by local Center experts. As shown in FIG. 5, a 700×1,000 nautical mile limit rectangle 260 may be used. Again, the size of this limit rectangle 260 may be user adjustable.

Referring back to FIG. 3, at step 206, if a reference route meets the limit rectangle and time savings criteria described in the previous step, the dynamic weather route system 102 tests the reference route for conflict with modeled weather and traffic. If no weather or traffic conflicts exist, the process skips to step 214. Otherwise, the process proceeds to step 208.

At step 208, if weather or traffic conflicts are detected on the reference route in the previous step, the dynamic weather route system 102 automatically attempts to find minimum delay reroute, referred to herein as the candidate alternate route relative to the reference route. Candidate alternate routes are further tested as described herein to determine if they meet the criteria to be the proposed as the dynamic weather route. Exemplary dynamic weather routes are shown in FIGS. 4 and 5 and are labeled as "dynamic weather route" in each of FIGS. 4 and 5.

In an illustrative embodiment, the dynamic weather route system 102 resolves weather conflicts on a 60 minute time horizon. In an illustrative embodiment, traffic conflicts are resolved on a 12 minute time horizon. Since weather avoidance accounts for most of the delay in air traffic operations, two solutions are computed by the dynamic weather route system 102, and users can configure the system 102 to post weather solutions only or integrated weather and traffic solutions.

To find the dynamic weather route, the dynamic weather route system 102 generates candidate alternate routes by inserting up to two auxiliary waypoints between a flight's current track position and the capture fix of the reference route. Exemplary auxiliary waypoints are depicted in FIGS. 4 and 5. It should be noted that more than two waypoints could be inserted; in practice however, two waypoints is appropriate for the vast majority of weather avoidance scenarios.

In an illustrative embodiment, auxiliary waypoints are first computed in the x-y coordinate frame for the home Center, then converted to fix-radial-distance (FRD) format relative to nearby named fixes. (Named fixes are based on the FAA 56-day adaptation, supplemented with fixes from the national En-Route Automation Modernization (ERAM) adaptation data base and the Navigation Reference System (NRS).) Nearby named fixes are selected according to the following search ordering:

Capture fix if distance<100 nmi, or
Nearest flight plan fix if distance<100 nmi, or
Nearest non-NRS nearby fix if distance<100 nmi, or else
Closest flight plan fix (even if distance>100 nmi).

The dynamic weather route system 102 then tests candidate alternate routes for flying time delay relative to the reference route. The candidate alternate route that results in the minimum flying time delay relative to the reference route and meets the weather, or weather and traffic constraints is selected as the candidate alternate route for further analysis by the dynamic weather route system 102.

Referring again to FIG. 3, at step 210, the dynamic weather route system 102 optionally snaps the auxiliary waypoints in the candidate alternate route determined in step 208 to nearby named fixes. That is, since solutions that include auxiliary waypoints defined in terms of FRDs are suitable only for data link applications, neighboring solutions where FRD waypoints are replaced with nearby named fixes are automatically computed.

Using the FRD auxiliary waypoint solution as a starting point, the dynamic weather route system 102 attempts to find that combination of nearby named fixes that when used in place of their respective FRD waypoints still do not cause the flight trajectory to conflict with modeled weather, or weather and traffic.

In this analysis "nearby" is defined to be within a preset distance, such as 25 nautical miles of the FRD auxiliary waypoint. The named fix trajectory that is minimum delay relative to the FRD trajectory, and does not conflict with weather, or weather and traffic, is selected as the nearby named fix solution and the candidate alternate route is modified accordingly. FIG. 4 depicts a nearby named fix with reference to a FRD auxiliary waypoint.

Referring to FIG. 3, at step 212, the dynamic weather route system 102 tests the candidate alternate route that results in the minimum flying time delay relative to the reference route found in steps 208 and 210 for potential flying time savings relative to the actual current flight plan trajectory. If the time to fly along the candidate alternate route saves more time than a preset amount, e.g., 5 minutes, the process continues to step 214. If the time saved by the proposed candidate alternate route is less than the preset amount, then the process returns to step 204. The preset amount of flying time savings may be user adjustable dependent upon workload. The preset amount of flying time savings may also be set to some value less than the trigger value for the reference route, e.g., less than 5 minutes. The reason for this is that it may be more important to display a flight with a potential reference route savings of 5 or more minutes even though the savings for the dynamic weather route solution is less than 5 min. The user might be able modify the dynamic weather route solution to achieve greater savings. At step 214, for all flights that meet the minimum flying time savings criteria in step 212, their proposed candidate alternate routes and their actual current flight plan trajectories are analyzed for downstream sector congestion by the dynamic weather route system 102. If a proposed candidate alternate route would take an aircraft directly into a congested sector, the reroute would likely be unacceptable from an air traffic control perspective.

Alternatively, if the current active flight plan has the aircraft flying into congested airspace, while the candidate alternate route takes the flight out of congested airspace, then the proposed dynamic flight plan route might be preferable and ease congestion. The user (either a flight dispatcher or a traffic manager) at this point can look at the congestion information and decide based on their requirement whether the proposed dynamic weather route is acceptable from a congestion point of view.

In an illustrative embodiment, the dynamic weather route system 102 may utilize the FACET technology for computing downstream sector congestion. As mentioned above, FACET is a National Airspace System (NAS)-based data analysis and simulation system, which reads in FAA provided air traffic data. The aircraft paths are simulated, with NOAA Rapid Refresh one, two, three, and six-hour winds, to fly along their nominal flight plans as filed with the FAA, using the Base of Aircraft Data (BADA) look up tables for aircraft performance. The aircraft location at each one-minute step for a two-hour period is added to corresponding sector counts. The monitor/alert parameter (MAP) values are obtained from the FAA as well. Each aircraft's current flight plan route and the proposed dynamic flight plan route determined by the dynamic weather route system 102 are checked for travel through congested sectors.

At step 216, the dynamic weather route system 102 posts the proposed dynamic flight plan routes to a computer-generated list 270 on the display 112 as shown in FIG. 7. In an illustrative embodiment, the list generated by the system 102 displays, aircraft call sign and aircraft type, the departure and destination airports, potential flying time savings for the reference route, potential flying time savings for the dynamic weather route, the return capture fix and the number of auxiliary waypoints in the dynamic flight plan routes, traffic conflict status, sector congestion status, weather conflict status, and the status of any active Traffic Management Initiatives (TMIs) for the flight (TMU status not shown in FIG. 6).

In an illustrative embodiment, the dynamic weather route system 102 may allow a user to set alert values based on user workload, potential flying time savings benefit, and other factors. In an illustrative embodiment, the list is configurable to display FRD solutions or nearby named fix solutions.

Referring to FIG. 3, at step 218, the dynamic weather route system 102 includes a trial planner that is the user's primary tool for evaluating dynamic flight plan routes. In particular, an interactive rapid-feedback trial planner tool, which is part of the dynamic weather route system 102, enables users to quickly and easily visualize the proposed dynamic flight plan routes and modify them if necessary.

Figure 8:
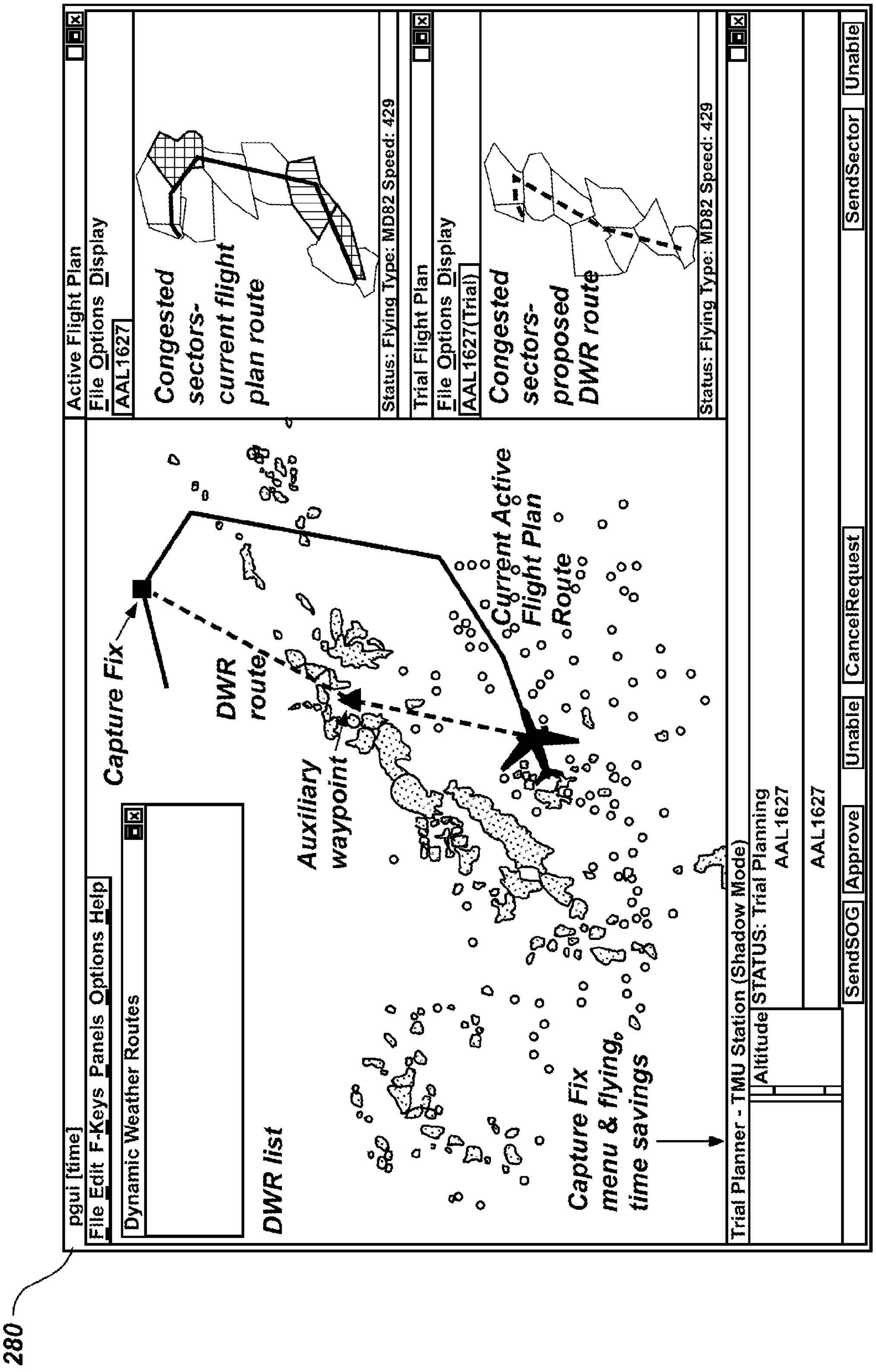
FIG. 8 is an exemplary screen shot of a graphical user interface generated according to an illustrative embodiment of the present disclosure.

FIG. 8 depicts an exemplary screen shot 280 of a graphical user interface. A user may click on the list to activate a trial plan for a selected flight. Through the graphical user interface, a user is able to change the capture fix. Auxiliary waypoints may be moved through a click and drag procedure to adjust the dynamic flight plan route or to automatically snap to a nearby named fix. Auxiliary waypoint may also be added or removed the point and click actions. Traffic and weather conflict status, flying time savings, and downstream sector congestion information are updated and displayed in real-time as a user adjusts the trial plan route.

In the foregoing Detailed Description, various features of the present disclosure are grouped together in a single illustrative embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed illustrative embodiment. Thus, the following claims are hereby incorporated into this Detailed Description of the Disclosure by this reference, with each claim standing on its own as a separate illustrative embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A computer-implemented method for a continuous and automatic real-time search that identifies and proposes corrections to original weather avoidance routes for a plurality of in-flight en route aircraft that could save flying time while avoiding convective weather, the method comprising:

receiving real-time updates of aircraft state data and atmospheric data relevant to the plurality of in-flight en route aircraft; the updates of aircraft state data including original weather avoidance routes, and surveillance tracking data; the updates of atmospheric data including wind data, real-time convective weather data, and convective weather forecast data; the real-time convective weather data originating from NexRad radars;

computing 4-dimensional (4D) trajectory predictions for the plurality of in-flight en route aircraft based on the real-time updates of aircraft state data and atmospheric data;

processing the aircraft state data, the atmospheric data, and associated trajectory predictions to define reference routes for the plurality of in-flight en route aircraft; each of the reference routes having a starting point at or near the in-flight en route aircraft's current position and an ending point at or near a downstream return capture waypoint on the associated original weather avoidance route, each of the reference routes eliminating one or more waypoints on the associated original weather avoidance route;

testing the reference routes to identify preferred reference routes that produce a minimum flying time savings relative to the associated original weather avoidance routes;

processing the preferred reference routes to search for convective weather conflicts along the preferred reference routes;

defining route corrections to the associated original weather avoidance routes for the plurality of in-flight en route aircraft by either:

(i) selecting the preferred reference routes as the route corrections to the associated original weather avoidance routes when the preferred reference routes are free of weather conflicts; or (ii) (a) automatically resolving weather conflicts in en route airspace along the preferred reference routes when the preferred reference routes are not free of weather conflicts to thereby create current weather-corrected routes, the weather conflicts being automatically resolved on a computer processor;

(b) testing, with the processor, the current weather-corrected routes to identify preferred weather-corrected routes that produce a minimum flying time savings relative to the associated preferred reference routes; and (c) selecting, with the processor, the preferred weather-corrected routes that have the greatest flying time savings relative to the associated original weather avoidance routes, the selected preferred weather-corrected routes becoming the route corrections to the associated original weather avoidance routes;

proposing the route corrections to the associated original weather avoidance routes on a computer display; and repeating the above, continuously and automatically, for the plurality of in-flight en route aircraft as real-time updates of aircraft state data and atmospheric data relevant to the plurality of in-flight en route aircraft are received.

2. The method of claim 1, wherein testing the reference routes to identify preferred reference routes includes testing the reference routes to identify preferred reference routes that produce a minimum potential wind-corrected flying time savings relative to the associated original weather avoidance routes.

3. The method of claim 1, wherein the original weather avoidance routes of the plurality of in-flight en route aircraft include inefficient route segments, or dog-legs.

4. The method of claim 1, wherein the minimum flying time savings is greater than a predetermined trigger value.

5. The method of claim 4, wherein the predetermined trigger value is approximately 5 minutes.

6. The method of claim 1, wherein the downstream return capture waypoint is a fix on the original weather avoidance route of one of the aircraft of the plurality of in-flight en route aircraft.

7. The method of claim 6, wherein the fix is inside a preset limit rectangle or limit region.

8. The method of claim 6, wherein the fix is a last fix before a standard arrival route for a destination airport.

9. The method of claim 6, wherein the fix is outside of a predetermined distance from a destination airport.

10. The method of claim 9, wherein the predetermined distance is approximately 100 nautical miles, or more, from the destination airport.

11. The method of claim 1, wherein processing the preferred reference routes to compute weather-corrected routes that resolve the current and future convective weather conflicts includes creating one or more auxiliary waypoints to form the preferred reference routes to avoid the convective weather conflicts.

12. The method of claim 11, wherein at least one auxiliary waypoint has a nearby named navigational fix.

13. The method of claim 12, further comprising replacing at least one auxiliary waypoint with the nearby named navigational fix.

14. The method of claim 1, wherein the minimum flying time savings is user adjustable.

15. The method of claim 14, wherein the minimum flying time savings is approximately 5 minutes.

16. The method of claim 1, further comprising testing downstream sector congestion of the route corrections to the associated original weather avoidance routes.

17. The method of claim 1, further comprising displaying the flight ID and flying time savings for the plurality of in-flight en route aircraft based on the route corrections.

18. The method of claim 1, further comprising testing and resolving the route corrections for traffic conflicts and other relevant operational constraints such as special use airspace and congested airspace.

19. The method of claim 1, further comprising generating an interactive flight map on the computer display and interactive functions that enable users to visualize the route corrections to the associated original weather avoidance routes, modify the location and/or the number of auxiliary waypoints or change the capture fix, and then automatically see the impact of their modifications and changes on critical parameters such as proximity to weather, traffic conflicts, flying time savings, and downstream sector congestion.

20. The method of claim 1, wherein each of the reference routes for the plurality of in-flight en route aircraft is one of a direct route to a downstream capture fix, a wind-optimal route to a downstream capture fix, a route to a more efficient standard arrival route into a destination airport, and a user-preferred route.

21. The method of claim 11, wherein the convective weather conflicts are modeled using a group of polygons that reflect modeled weather at different altitudes and at future time horizons.

22. The method of claim 21, wherein the polygons comprise arbitrary shapes and sizes.

23. The method of claim 21, wherein the resolutions to the convective weather conflicts account for predicted speeds and directions of the plurality of in-flight en route aircraft and predicted speeds and directions of the weather modeled by the polygons over time and over different altitudes.

24. The method of claim 1, further comprising minimizing a number of waypoints in the route corrections to the associated original weather avoidance routes.

25. The method of claim 11, wherein creating one or more auxiliary waypoints to form the preferred reference routes around or over the convective weather conflicts includes minimizing the number of waypoints to minimize aircraft navigation.

26. The method of claim 25, wherein the number of waypoints is two in order to minimize navigation of commercial air transport operations.

27. The method of claim 21, wherein an allowable gap between convective weather polygons is a minimum of 50 nautical miles.

* * * * *